United States Patent
Lim et al.

(10) Patent No.: US 10,416,355 B2
(45) Date of Patent: Sep. 17, 2019

(54) OPTICAL FILM WITH EXCELLENT SOLVENT RESISTANCE AND POLARIZING PLATE COMPRISING SAME

(71) Applicant: LG CHEM, LTD., Seoul (KR)

(72) Inventors: Yirang Lim, Daejeon (KR); Nam jeong Lee, Daejeon (KR); Hwa Sub Shim, Daejeon (KR); Jun Wuk Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 582 days.

(21) Appl. No.: 15/024,676

(22) PCT Filed: Sep. 23, 2014

(86) PCT No.: PCT/KR2014/008790
§ 371 (c)(1),
(2) Date: Mar. 24, 2016

(87) PCT Pub. No.: WO2015/046841
PCT Pub. Date: Apr. 2, 2015

(65) Prior Publication Data
US 2016/0231466 A1 Aug. 11, 2016

(30) Foreign Application Priority Data

Sep. 30, 2013 (KR) .................. 10-2013-0117004
Sep. 18, 2014 (KR) .................. 10-2014-0124592

(51) Int. Cl.
| | | |
|---|---|---|
| *G02B 5/30* | (2006.01) | |
| *G02B 1/14* | (2015.01) | |
| *G02B 5/00* | (2006.01) | |
| *C08L 83/00* | (2006.01) | |

(52) U.S. Cl.
CPC ............. *G02B 1/14* (2015.01); *C08L 83/00* (2013.01); *G02B 5/008* (2013.01); *G02B 5/30* (2013.01); *G02B 5/3025* (2013.01)

(58) Field of Classification Search
CPC .......... G02B 1/14; G02B 5/30; G02B 5/3025; G02B 5/3008
USPC ....................... 359/487.02, 487.06
See application file for complete search history.

(56) References Cited

U.S. PATENT DOCUMENTS

| | | | |
|---|---|---|---|
| 6,758,916 B1 * | 7/2004 | McCormick | C23C 22/34 148/247 |
| 7,057,682 B2 * | 6/2006 | Watson | G02F 1/133528 349/141 |
| 2009/0086130 A1 | 4/2009 | Oikawa et al. | |
| 2010/0010145 A1 * | 1/2010 | Matsuzawa | B01J 35/004 524/500 |
| 2011/0157525 A1 | 6/2011 | Yamasaki et al. | |
| 2012/0107532 A1 * | 5/2012 | Baird | B41M 5/504 428/32.34 |
| 2013/0202867 A1 | 8/2013 | Coggio et al. | |
| 2014/0098325 A1 | 4/2014 | Murata et al. | |
| 2014/0302328 A1 | 10/2014 | Cho et al. | |

FOREIGN PATENT DOCUMENTS

| | | |
|---|---|---|
| CN | 102112899 A | 6/2011 |
| EP | 1661938 A1 | 5/2006 |
| EP | 1942132 A1 | 7/2008 |
| JP | 55-132242 A | 10/1980 |
| JP | 07-241971 A | 9/1995 |
| JP | 2003-340999 A | 12/2003 |
| JP | 2005-097571 A | 4/2005 |
| JP | 2006-205579 A | 8/2006 |
| JP | 2006-215107 A | 8/2006 |
| JP | 2007-130984 A | 5/2007 |
| JP | 2008-132768 A | 6/2008 |
| JP | 2008-279736 A | 11/2008 |
| JP | 2009-204929 A | 9/2009 |
| JP | 2009-300658 A | 12/2009 |
| JP | 2011-001457 A | 1/2011 |
| KR | 10-2012-0030937 A | 3/2012 |
| KR | 10-2012-0030975 A | 3/2012 |
| TW | 200809279 A | 2/2008 |
| TW | 201303392 A1 | 1/2013 |
| TW | 201317114 A1 | 5/2013 |
| WO | 2007/032295 A1 | 3/2007 |

OTHER PUBLICATIONS

"Nippon Shokubai's particulate product list", URL : http://www.nissanchem.co.jp/products/materials/inorganic/products/01/.
"Various lineup of Snowtex", Japan, Nissan Chemical Industries, Ltd., URL : https://www.shokubai.co.jp/ja/particle/products.
Dorf Ketal: "Organic Titanate—A New Additive for Solvent-Based Printing Ink", XP055360971, Tyzor Iam, Product Bulletin issued by the Product Management Group, URL:https://www.dorfketal.com/including/PDF Files/ K16107_tyzor_iam_final.pdf, Jan. 4, 2010.

* cited by examiner

*Primary Examiner* — Ricky D Shafer
(74) *Attorney, Agent, or Firm* — Dentons US LLP (57) ABSTRACT

The present invention relates to an optical film including a transparent film, and a coating layer on at least one surface of the transparent film, wherein the coating layer is formed using a water-dispersible coating composition comprising a polymer resin including a hydroxyl group; at least one cross-linking agent selected from the group consisting of a titanate-based cross-linking agent and a zirconate-based cross-linking agent; and water-dispersible fine particles, and a polarizing plate including the same.

10 Claims, 1 Drawing Sheet

OPTICAL FILM WITH EXCELLENT SOLVENT RESISTANCE AND POLARIZING PLATE COMPRISING SAME

This application is a National Stage Entry of International Application No. PCT/KR2014/008790, filed Sep. 23, 2014, and claims the benefit of Korean Application No. 10-2013-0117004, filed on Sep. 30, 2013, and Korean Application No. 10-2014-0124592, filed Sep. 18, 2014, all of which are hereby incorporated by reference in their entirety for all purposes as if fully set forth herein.

TECHNICAL FIELD

The present invention relates to an optical film having excellent solvent resistance and a polarizing plate including the same.

BACKGROUND ART

Existing polarizing plates mostly use triacetyl cellulose films having properties such as high transmittance, optical isotropy and a zero-defect surface as a protective film for protecting a polarizing film made of polyvinyl alcohol. However, triacetyl cellulose films are vulnerable to heat and moisture, and therefore, has had a problem in that a light leakage phenomenon in which light at the edge is excessively exposed when the film is used for a long period of time in high temperature and high humidity environments due to a decrease in the degree of polarization and deterioration by moisture. In order to compensate such a disadvantage, attempts to use films with a composition having high resistance for moisture and low phase-difference properties such as cyclic olefin-based reins or acryl-based resins as a protective film for a polarizing plate have been made. Particularly, acryl-based films are known to have an advantage not only in optical properties and durability but also in costs.

However, these films have surfaces with non-polar properties, therefore, adhesive strength is not sufficiently secured when aqueous adhesives, which have been used in the art for attaching a polarizer and a protective film, are used. Methods of using non-aqueous adhesives have been proposed in order to solve such a problem. However, acryl-based films have high surface friction and have poor resistance for organic solvents, therefore, adhesive layer coating is difficult, and when adhesives including an organic solvent are used, problems such as damage on a film surface occur.

Recently, a functional coating layer such as an anti-glare layer, an anti-reflection layer and/or a hard coating layer is sometimes formed on the surface of a protective film in order to improve the physical properties of a polarizing plate and a display, however, as described above, acryl-based films have insufficient solvent resistance thereby are not smoothly attached to such a functional coating layer, and even when a coating layer is formed, a problem of the film being melted occurs, and as a result, the application has been limited.

In addition, acryl-based films generally have high surface friction, and accordingly, there are problems in that a blocking phenomenon, in which film surfaces adhere together, readily occurs when winding the film, and a slip property becomes inferior.

Accordingly, the development of an optical film satisfying durability and a slip property, and having excellent solvent resistance without inhibiting transparency has been required.

DISCLOSURE

Technical Problem

In view of the above, an object of the present invention is to provide an optical film having excellent solvent resistance while having excellent transparency.

Technical Solution

In one aspect, the present invention provides an optical film including a transparent film, and a coating layer on at least one surface of the transparent film, wherein the coating layer is formed using a water-dispersible coating composition comprising a polymer resin including a hydroxyl group; at least one cross-linking agent selected from the group consisting of a titanate-based cross-linking agent and a zirconate-based cross-linking agent; and water-dispersible fine particles.

In another aspect, the present invention provides a polarizing plate including a polarizer, and the optical film according to the present invention on at least one surface of the polarizer.

Advantageous Effects

A protective film according to the present invention includes a coating layer and thereby has excellent solvent resistance, and as a result, has an advantage in that, when a functional surface coating layer such as an anti-glare layer, an anti-reflection layer or a hard coating layer is required on the exterior of a polarizing plate, the formation thereof is very simple.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As a result of extensive studies for developing an optical film that does not have a problem such as damage on a film surface or peel-off of a coating layer when a functional surface coating layer is used, the inventors of the present invention have found that, when a coating layer is formed on the surface of a film using a coating composition including a polymer resin having a hydroxyl group, and a specific cross-linking agent component, solvent resistance of the film is significantly improved, and completed the present invention.

Figure 1:
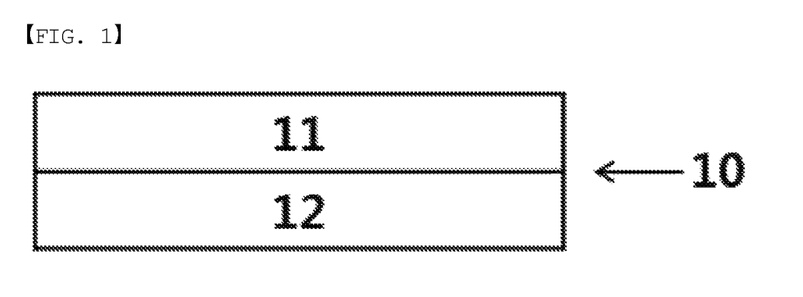
FIG. 1 depicts an optical film according to an exemplary embodiment of the present specification.

More specifically, an optical film (10) of the present invention includes a transparent film (11), and a coating layer (12) on at least one surface of the transparent film as shown in FIG. 1, wherein the coating layer is formed using a water-dispersible coating composition comprising a polymer resin including a hydroxyl group; at least one crosslinking agent selected from the group consisting of a titanate-based cross-linking agent and a zirconate-based cross-linking agent; and water-dispersible fine particles.

According to the research carried out by the inventors of the present invention, when a polymer resin including a hydroxyl group, and a titanate-based cross-linking agent and/or a zirconate-based cross-linking agent are included together as in the present invention, the hydroxyl group of the polymer resin is reacted with the titanate and/or the zirconate, and solvent resistance is improved as the polymer chain is cross-linked.

Hereinafter, the components of the coating composition will be specifically described.

First, the types of the polymer resin are not particularly limited as long as it is a water-dispersible polymer resin containing a hydroxyl group.

Specific examples of the polymer resin capable of being used in the present invention may include a polyurethane resin, a polyester resin, an acrylic resin, a polyurethane acrylate resin, a polyester acrylic resin, a polyester urethane resin or a mixture thereof, but are not limited thereto.

First, the polyurethane resin means a resin including an urethane repeating unit formed by the reaction of a polyol and an isocyanate in the main chain, and herein, compounds including two or more hydroxyl groups, for example, polyester-based polyol, polycarbonate-based polyol, polyether polyol, polyacrylic polyol and the like may be used as the polyol without limit, and as the isocyanate, compounds having two or more NCO groups may be used without limit.

Herein, as the isocyanate component, for example, either one or a combination of two or more types from the group consisting of toluene diisocyanate (TDI), 4,4-diphenylmethan diisocyanate (MDI), 1,5-naphthalene diisocyanate (NDI), tolidine diisocyanate (TODI), hexamethylene diisocyanate (HMDI), isoprone diisocyanate (IPDI), p-phenylene diisocyanate, trans-cyclohexane, 1,4-diisocyanate and xylene diisocyanate (XDI) may be used.

Meanwhile, the polyester-based polyol may be obtained by reacting a polybasic acid component and a polyol component, and herein, examples of the polybasic acid may include aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid and tetrahydrophthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid and itaconic acid; alicyclic dicarboxylic acids such as hexahydrophthalic acid, tetrahydrophthalic acid, 1,3-cyclohexane dicarboxylic acid and 1,4-cyclohexane dicarboxylic acid; or reactive derivatives such as acid anhydrides, alkyl esters and acid halides thereof. These may be used either alone or as a combination of two or more types. In addition, using isophthalic acid substituted with a sulfonate as the basic acid is particularly preferable in terms of water dispersibility.

Meanwhile, the polycarbonate-based polyol may be obtained by reacting a compound having a carbonate group and a polyol component, and herein, examples of the compound having a carbonate group may include diphenyl carbonate, dialkyl carbonate, alkylene carbonate and the like.

In addition, the polyether polyol may be obtained by adding alkylene oxide to the polyol component by ring opening polymerization.

Meanwhile, the polyol component is not particularly limited as long as the component has two or more hydroxyl groups in the molecule, and any suitable polyol may be employed. Examples of the polyol may preferably include at least one type selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Among these, at least one type selected from the group consisting of polytetramethylene glycol (PTMG), polypropylene glycol (PPG) and polyethylene glycol (PEG) is particularly preferable.

Furthermore, the polyacrylic polyol may be obtained by copolymerizing an acrylic monomer including a hydroxyl group or an acrylic monomer including a sulfonic acid group with monomers having a hydroxyl group. Herein, the acrylic monomer and the monomers having a hydroxyl group may be used either alone or as a combination of two or more types. Other monomers may also be copolymerized in addition to the acrylic monomer component. Herein, as the other monomers, unsaturated nitriles such as (meth)acrylonitrile; unsaturated amides such as (meth)acrylic imide; olefins such as ethylene and propylene; a β-unsaturated aliphatic monomer such as halogenated vinyl chloride and vinylidene chloride; a β-unsaturated aromatic monomer such as styrene and methylstyrene, and the like, may be used, and these may be used either alone or as a combination of two or more types.

Next, the polyester resin means a resin including an ester group formed by the reaction of carboxylic acid and alcohol in the main chain, and may be preferably a water dispersible polyester resin, and more preferably may include polyester glycol formed by the reaction of a polybasic acid and a polyol.

Herein, examples of the polybasic acid component may include aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid and tetrahydrophthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid and itaconic acid; alicyclic dicarboxylic acids such as hexahydrophthalic acid, tetrahydrophthalic acid, 1,3-cyclohexane dicarboxylic acid and 1,4-cyclohexane dicarboxylic acid; or reactive derivatives such as acid anhydrides, alkyl esters and acid halides thereof. These may be used either alone or as a combination of two or more types. Among these, terephthalic acid, isophthalic acid, succinic acid and the like are particularly preferable.

Meanwhile, the polyol is not particularly limited as long as it has two or more hydroxyl groups in the molecule, and any suitable polyol may be employed. Examples of the polyol is preferably at least one type selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. In addition, using carboxylic group-containing dimethylol alkanoic acid, dimethylol acetic acid, dimethylol propionic acid, dimethylol butanoic acid and the like either alone or as a combination of two or more types as the polyol is particularly preferable in terms of water dispersibility.

Meanwhile, the polyester glycol is formed by reacting the polybasic acid and the polyol in a molar ratio of 2.5:1 to 1:2.5, preferably in a molar ratio of 2.3:1 to 1:2.3, and more preferably in a molar ratio of 2:1 to 1:2. When the molar ratio of the polybasic acid and the polyol reaction is outside the above range, a smell is caused by unreacted monomers or coating defects may occur.

As the method for preparing the polyester resin, any suitable method known in the art may be employed. For example, the polyester resin of the present invention may be prepared by polycondensation after an esterification reaction of a polybasic acid and a polyol, or polycondensation after an esterification reaction of a polybasic acid anhydride and a polyol, and more specifically, these methods may be carried out including (1) a raw material mixing step obtaining a raw material mixture by mixing polymerization raw materials for polyester polymerization, (2) an esterification reaction step esterifying the raw material mixture, and (3) a polycondensation step obtaining polyester by polycondensing the esterified raw material mixture.

Meanwhile, the polyester resin may further include additional components in addition to the components described above within a range of not damaging the physical properties of the present invention.

Next, the acryl-based resin means a resin including a repeating unit derived from a (meth)acrylate unit, and the acryl-based resin of the present invention may be obtained by, for example, copolymerizing an acrylic monomer or a vinyl monomer. These may be used either alone or as a combination of two or more types. Other monomers may also be copolymerized in addition to the vinyl monomer component. Herein, as the other monomers, unsaturated nitriles such as (meth)acrylo nitrile; unsaturated amides such as (meth)acrylamide; a β-unsaturated aliphatic monomer such as halogenated vinyl chloride or vinylidene chloride; a β-unsaturated aromatic monomer such as styrene or methylstyrene, and the like, may be used. These may be used either alone or as a combination of two or more types.

Meanwhile, the polymer resin of the present invention may include two or more types among an ester-based repeating unit, a urethane-based repeating unit, and an acryl-based repeating unit. For example, the polymer resin of the present invention may be a polyester urethane resin including an ester-based repeating unit and a urethane-based repeating unit together, may be a polyester acrylic resin including an ester-based repeating unit and an acryl-based repeating unit together, or may be a polyurethane acryl-based resin including a urethane-based repeating unit and an acryl-based repeating unit together, or may include all of the three repeating units.

Herein, the polyester acryl-based resin is a resin including an ester-based repeating unit and an acryl-based repeating unit, and may be prepared by copolymerizing an acryl-based monomer component to polyester glycol. More specifically, the polyester acryl-based resin of the present invention may include the ester-based repeating unit and the acryl-based repeating unit described above. Herein, the polyester unit plays a role of increasing substrate adhesion, and the acryl-based unit may further improve solvent resistance.

Herein, examples of the acryl-based monomer capable of being used may include one or more types selected from the group consisting of alkyl (meth)acrylate, alkyl acrylate, epoxy (meth)acrylate, hydroxyalkyl acrylate, alkyl (meth) acrylic acid including a carbonyl group, alkyl acrylic acid, and acrylate including a sulfonate. Herein, examples of the acrylate including a sulfonate may include acrylate including sodium 2-methyl-2-propene-1-sulfonate, acrylate including sodium aryl sulfonate, acrylate including 2-propene-1-sulfonate and the like. Meanwhile, among the acryl-based monomers, when an epoxy acrylate monomer containing an epoxy group is copolymerized to the polyester resin, the epoxy ring is dissociated at a high temperature leading to the cross-linkage between the epoxy rings due to an addition polymerization reaction, and there is an advantage in that high temperature stability is improved by enhancing high temperature durability of the polyester main chain.

In addition, the polyester resin may copolymerize other monomers in addition to the acrylic monomer component as necessary. Herein, as the other monomers, unsaturated nitriles such as (meth)acrylo nitrile; unsaturated amides such as (meth)acrylamide; olefins such as ethylene or propylene; a β-unsaturated aliphatic monomer such as halogenated vinyl chloride or vinylidene chloride; a β-unsaturated aromatic monomer such as styrene or methylstyrene, and the like, may be used, and these may be used either alone or as a combination of two or more types.

More preferably, the polyester resin of the present invention may include two or more types of acryl-based monomers, and most preferably include an alkyl (meth)acrylate monomer, and an epoxy (meth)acrylate monomer such as glycidyl (meth)acrylate.

Meanwhile, the polyester acryl-based resin may have the polyester glycol and the acryl-based monomer in a weight ratio of, but not limited to, approximately 1:9 to 9:1 in the reactant, more preferably approximately 2:8 to 8:2, and most preferably approximately 3:7 to 7:3. When the content of the polyester glycol and the acrylic monomer satisfies the above range in the reactant, properties such as adhesion with a substrate and solvent resistance are excellent.

Next, the polyester urethane-based resin includes an ester-based repeating unit together with a urethane-based repeating unit, and for example, may be formed by reacting an isocyanate with the polyester resin described above. Herein, the equivalence ratio of the polyester resin and the isocyanate is, for example, 2:1 to 1:2, preferably 1.5:1 to 1:1.5, and more preferably 1.2:1 to 1:1.2. When the equivalence ratio satisfies the above range, the appearance of a coating layer formed using a coating composition including these components is very superior, and properties such as adhesion with a substrate and solvent resistance may be further improved.

Next, the polyurethane acryl-based resin is a resin including a urethane unit and an acryl-based unit, and may be prepared by additionally copolymerizing an acryl-based monomer component to a polyurethane resin. Such a polyurethane acryl-based resin has more improved solvent resistance and transparency when compared to a polyurethane-based resin that does not include an acryl-based unit.

Herein, examples of the acryl-based monomer capable of being used may include one or more types selected from the group consisting of alkyl (meth)acrylate, alkyl acrylate, epoxy (meth)acrylate, hydroxyalkyl acrylate, alkyl (meth) acrylic acid including a carbonyl group, alkyl acrylic acid, and acrylate including a sulfonate. Herein, examples of the acrylate including a sulfonate may include acrylate including sodium 2-methyl-2-propene-1-sulfonate, acrylate including sodium aryl sulfonate, acrylate including 2-propene-1-sulfonate, and the like.

In addition, the polyurethane acryl-based resin may copolymerize other monomers in addition to the acrylic monomer component as necessary. Herein, as the other monomers, unsaturated nitriles such as (meth)acrylonitrile; unsaturated amides such as (meth)acrylamide; olefins such as ethylene and propylene; a β-unsaturated aliphatic monomer such as halogenated vinyl chloride and vinylidene chloride; a β-unsaturated aromatic monomer such as styrene and methylstyrene, and the like, may be used, and these may be used either alone or as a combination of two or more types.

Meanwhile, the polyurethane acryl-based resin may have the polyurethane resin and the acryl-based monomer in a weight ratio of, but not limited to, approximately 1:9 to 9:1, and more preferably approximately 2:8 to 8:2. When the weight ratio of the polyurethane resin and the acryl-based monomer satisfies the above range, transparency may be readily secured, and coatability is excellent, therefore, there is an advantage in that the coating layer is readily formed.

Meanwhile, the polymer resin may further include additional components in addition to the components described above within a range of not damaging the physical properties of the present invention.

In order for enhancing water dispersibility, the polymer resin of the present invention may further include a functional group such as a carboxyl group and a sulfonate group in addition to a hydroxyl group as necessary. The polymer resin having a functional group such as a carboxyl group and a sulfonate group may be prepared by using monomers including the functional group described above when synthesizing the polymer resin, and herein, the monomer including a carboxyl group or a sulfonate group is preferably included in approximately 1 to 20% by weight with respect to the whole monomer mixture used in the preparation of the polymer resin.

Next, the cross-linking agent will be described. The coating composition of the present invention includes a titanate-based cross-linking agent and/or a zirconate-based cross-linking agent. The cross-linking agent bonds to the hydroxyl group of the polymer resin thereby induces bonding between the polymers, and plays a role of enhancing solvent resistance. According to the research carried out by the inventors of the present invention, when using a titanate-based cross-linking agent and/or a zirconate-based cross-linking agent as described above, an excellent solvent resistance improvement effect may be obtained with a lesser amount compared to other types of cross-linking agents.

Meanwhile, as the titanate-based cross-linking agent, cross-linking agents including a titanium atom may be used without limit, and for example, compounds represented by the following Chemical Formula 1 may be used.

[Chemical Formula 1]

In Chemical Formula 1, $R_1$ to $R_4$ are each independently a $C_{1-4}$ alkoxy group, a chelate group or a hydroxyl group, and herein, the chelate group includes lactate, triethanolaminate, acetylacetonate, acetoacetate or ethyl acetoacetate. Meanwhile, $R_1$ to $R_4$ may be the same as or different from each other.

As the zirconate-based cross-linking agent, cross-linking agents including a zirconium atom may be used without limit, and for example, compounds represented by the following Chemical Formula 2 may be used.

[Chemical Formula 2]

In Chemical Formula 2, $R_5$ to $R_8$ are each independently a $C_{1-4}$ alkoxy group, a chelate group or a hydroxyl group, and herein, the chelate group includes lactate, triethanolaminate, acetylacetonate, acetoacetate or ethyl acetoacetate. Meanwhile, $R_5$ to $R_8$ may be the same or different from each other.

In addition, the cross-linking agent may use commercially available titanate and zirconate-based cross-linking agents, and for example, Tyzor series manufactured by Dorf Ketal Chemicals LLC, orgatix series manufactured by Matsumoto fine chemical Co., Ltd., and the like, may be used.

Meanwhile, the content of the cross-linking agent may be 0.01 to 10 parts by weight, 0.03 to 10 parts by weight or 0.05 to 7 parts by weight with respect to 100 parts by weight of the polymer resin including a hydroxyl group. When the content of the cross-linking agent satisfies the above range, coatability and storage stability of the coating solution are excellent. Particularly, solvent resistance becomes more favorable as the content of the cross-linking agent increases, therefore, when a surface coating layer is formed on the coating layer formed using the water-dispersible coating composition, adhesion between the coating layer and the surface coating layer also significantly increases. In addition, there is also an advantage in that a slip property of a protective film is improved.

Next, the water-dispersible fine particles will be described.

The water dispersible fine particles capable of being used in the present invention may use any suitable fine particle, and examples thereof include inorganic-based fine particles, organic-based fine particles or a combination thereof. Examples of the inorganic-based fine particles may include inorganic oxides include silica-based, titania-based, alumina-based, zirconia-based, antimony-based, and the like. Examples of the organic-based fine particles include a silicone-based resin, a fluorine-based resin, a (meth)acryl-based resin, cross-linked polyvinyl alcohol, a melamine-based resin and the like.

Meanwhile, the content of the water-dispersible fine particles may be 0.01 to 20 parts by weight, 0.05 to 15 parts by weight or 0.1 to 10 parts by weight with respect to 100 parts by weight of the polymer resin including a hydroxyl group. When the content of the water-dispersible fine particles satisfies the above range, slip between films is smooth, a winding property becomes favorable since an anti-blocking property is improved, and film defects are also significantly improved after winding. In addition, there are advantages in that scratch resistance is improved, and film transparency is superior due to a low haze value.

Particularly, in the water-dispersible coating composition according to the present invention, the water-dispersible fine particles are preferably silica. Silica has more excellent blocking inhibition ability and has excellent transparency thereby produces almost no haze, and there is no coloration as well, and accordingly, influences on the optical properties of a polarizing plate are smaller. In addition, colloidal silica has favorable dispersibility and dispersion stability for a water-dispersible coating composition, therefore, workability is more excellent when forming the coating layer.

Meanwhile, the water-dispersible fine particles preferably has an average diameter (average first particle diameter) of approximately 50 nm to 500 nm, or 100 nm to 300 nm. When the average diameter of the water-dispersible fine particles satisfies the above range, stability of the coating solution is excellent, and haze is low since dispersion in the solution is uniform. In addition, by using fine particles having a particle diameter described above, unevenness is properly formed on the coating layer surface, and particularly, friction at the contact surface between the acryl-based film and the coating layer, and at the contact surface between the coating layers may be effectively reduced. As a result, blocking inhibition ability may be more superior.

The water-dispersible coating composition of the present invention is water-based, therefore, the fine particles are mixed as water dispersion. Specifically, when silica is employed as the fine particles, the silica is preferably mixed as colloidal silica. As the colloidal silica, commercially available products in the art may be used as they are, and examples thereof may include SNOWTEX series manufactured by Nissan Chemical Industries, Ltd., AEROSIL series manufactured by AIR PRODUCTS, EPOSTAR series and SOLIOSTAR RA series manufactured by Nippon Shokubai Co. Ltd., LSH series manufactured by Ranco, and the like.

In the optical film according to the present invention, the water-dispersible coating composition used in the formation of the coating layer most preferably includes the polymer resin including a hydroxyl group in 100 parts by weight, the at least one cross-linking agent selected from the group consisting of the titanate-based cross-linking agent and the zirconate-based cross-linking agent in 0.01 to 10 parts by weight, and the water-dispersible fine particles in 0.01 to 20 parts by weight.

The coating layer formed with such a water-dispersible coating composition has excellent solvent resistance thereby improves adhesion with a surface coating layer or a non-aqueous adhesive, and a slip property is also very excellent.

Meanwhile, in the present invention, the transparent film may have a single layer or have a structure in which two or more layers of films are laminated, and when the transparent film has a structure in which two or more layers of films are laminated, the laminated films may be formed with identical materials or different materials.

Herein, examples of the transparent film may include, but are not limited to, a polyethylene film, a polyurethane film, a polypropylene film, a polyolefin film, an ester-based film, an acryl-based film, a polyethylene terephthalate film, a polyvinyl alcohol-based film and/or a cellulose-based film, and the like.

Particularly, the transparent film of the present invention is preferably an acryl-based film. Herein, the acryl-based film means a film having a resin including an acrylate-based unit and/or a methacrylate-based unit as a main component, and the concept includes a film having not only a homopolymer resin formed with an acrylate-based unit or a methacrylate-based unit but also a copolymer resin copolymerizing other monomer units in addition to an acrylate-based unit and/or a methacrylate-based unit as a main component, and also includes a film formed by a blend resin blending other resins to an acrylic resin such as above.

Herein, examples of the acryl-based film may include a film including a copolymer including an alkyl (meth)acrylate-based unit and a styrene-based unit; and an aromatic-based resin having a carbonate part in the main chain, a film including an alkyl (meth)acrylate-based unit and at least one 3 to 6 membered-heteroring unit substituted with a carbonyl group, or a film including an alkyl (meth)acrylate-based unit, a styrene-based unit, at least one 3 to 6 membered-heteroring unit substituted with a carbonyl group, and a vinyl cyanide unit. In addition, an acryl-based film having a lactone structure may be included.

A monomer unit capable of being copolymerized to the acryl-based resin may include an aromatic vinyl-based unit, a 3 to 6-membered heteroring unit substituted with a carbonyl group, an acrylic acid unit, a glycidyl unit and the like. Herein, the aromatic vinyl-based unit refers to, for example, a unit derived from styrene, α-methylstyrene and the like, and the 3 to 6-membered heteroring unit substituted with a carbonyl group refers to, for example, a unit derived from a lactone ring, glutaric anhydride, glutarimide, maleimide, maleic anhydride and the like.

For example, the acryl-based film may be a film including a copolymer including an alkyl(meth)acrylate-based unit and at least one 3-membered to 10-membered heteroring unit substituted with a carbonyl group. Herein, the 3-membered to 10-membered heteroring unit substituted with a carbonyl group may be a lactone ring, glutaric anhydride, glutarimide, maleic anhydride, maleimide and the like.

Another example of the acrylic film may include a film including a blend resin blending an aromatic resin having a carbonate unit in the main chain to an acrylic resin. Herein, examples of the aromatic resin having a carbonate unit in the main chain may include a polycarbonate resin, a phenoxy resin and the like.

A method for preparing the acryl-based resin film is not particularly limited, and for example, the acryl-based resin film may be prepared by preparing a thermoplastic resin composition by sufficiently mixing a (meth)acrylate-based resin, other polymers, additives and the like using any suitable mixing method, and then molding the result to a film, or the acryl-based resin film may be prepared by preparing a (meth)acrylate-based resin, other polymers, additives and the like as a separate solution, then forming a uniformly mixed solution by mixing the separately prepared solutions, and molding the result to a film.

The thermoplastic resin composition may be prepared by, for example, pre-blending the film raw materials using any suitable mixer such as an omni mixer, and then extrusion kneading the obtained mixture. In this case, the mixer used in the extrusion kneading is not particularly limited, and for example, any suitable mixer including an extruder such as a monoaxial extruder and a biaxial extruder, a pressurized kneader, and the like, may be used.

Examples of the film molding method may include any suitable film molding method such as a solution casting method, a melting extrusion method, a calendar method and an extrusion molding method. Among these film molding methods, a solution casting method and a melting extrusion method are preferable.

Examples of a solvent used in the solution casting method may include aromatic hydrocarbons such as benzene, toluene and xylene; aliphatic hydrocarbons such as cyclohexane and decaline; esters such as ethyl acetate and butyl acetate; ketones such as acetone, methylethyl ketone and methylisobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; dimethyl sufoxide, and the like. These solvents may be used either alone or as a combination of two or more types.

Examples of a device used in the solution casting method may include a drum-type casting machine, a band-type casting machine, a spin coater and the like. Examples of the melting extrusion method may include a T die method, an inflation method and the like. The molding temperature is preferably 150° C. to 350° C., and more preferably 200° C. to 300° C.

When a film is molded using the T die method, the film having a roll shape may be obtained by mounting a T die at the front end of a known monoaxial extruder or a biaxial extruder, and winding the film extruded to a film shape. Herein, the film may be monoaxially oriented by applying orientation in the extrusion direction by properly adjusting the temperature of a winding roll. In addition, the film may be simultaneous biaxially oriented, sequential biaxially orientated and the like by orienting the film in the perpendicular direction to the extrusion direction.

The acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film. Film performances are improved when the film is biaxially oriented since mechanical strength is improved. By mixing the acryl-based film with other thermoplastic resins, the increase in the phase difference may be suppressed even when the film is oriented and optical isotropy may be maintained.

The orientation temperature is preferably in a range near the glass transition temperature of a thermoplastic resin composition, which is a film raw material, and preferably in a range of (glass transition temperature−30° C.) to (glass transition temperature+100° C.), and more preferably in a range of (glass transition temperature−20° C.) to (glass transition temperature+80° C.). When the orientation temperature is less than (glass transition temperature−30° C.), there may be a problem in that sufficient degree of orientation may not be obtained. On the contrary, when the orientation temperature is greater than (glass transition temperature+100° C.), there may be a problem in that the flow of the resin composition occurs and stable orientation may not be carried out.

The degree of orientation defined by an area ratio is preferably 1.1 times to 25 times, and more preferably 1.3 times to 10 times. When the degree of orientation is less than 1.1 times, improvement in toughness, which accompanies orientation, may not be obtained. When the degree of orientation is greater than 25 times, as much effects as the increased degree of orientation may not be recognized.

The orientation rate is preferably, 10%/min to 20,000%/min in one direction, and more preferably 100%/min to 10,000%/min. When the orientation rate is less than 10%/min, there may be a problem in that manufacturing costs may increase since relatively a long period time is required for obtaining sufficient degree of orientation. When the orientation rate is greater than 20,000%/min, there may be a problem in that the oriented film may break.

Heat treatment (annealing) and the like may be carried out on the acryl-based film after orientation in order for stabilizing optical isotropy or mechanical properties of the film. Conditions for the heat treatment are not particularly limited, and any suitable condition known in the art may be employed.

Such an optical film according to the present invention described above may be prepared using, for example, a method including a step of forming a coating layer on at least one surface of the transparent film, and the coating layer is formed using the water-dispersible coating composition according to the present invention described above.

Herein, the step of forming a coating layer may be carried out using a method of applying the water-dispersible coating composition on a substrate film using methods well known in the art such as a bar coating method, a gravure coating method and a slot die coating method, and drying the result.

In addition, the drying may be carried out through a convection oven and the like, but the method is not limited thereto, and the drying is preferably carried out for 10 seconds to 5 minutes at a temperature of 90° C. to 150° C. The drying temperature is different depending on the steps of the coating, and for films completed with orientation, the drying may be carried out in a temperature range that does not exceed a glass transition temperature (Tg) of the film, and when orientation is included, the drying is simultaneously carried out with the orientation at the temperature of the orientation, and the drying is carried out in a temperature range that does not exceed a decomposition temperature (Td) of the film.

Meanwhile, in the optical film according to the present invention, the coating layer may have a thickness of 50 nm to 2000 nm, 100 nm to 1000 nm, or 200 nm to 800 nm. When the thickness of the coating layer satisfies the above range, an adhesive property, an attaching property and a winding property are excellent.

In addition, the coating layer may have a friction coefficient of, for example, 0 to 0.6, however, the value is not limited thereto. As the friction coefficient of the coating layer decreases, a slip property becomes excellent, and when the friction coefficient satisfies the above range, a winding property is excellent. Herein, the friction coefficient means a relative ratio dividing friction by normal force.

Furthermore, in the present invention, the coating layer may have transparency (haze) of 0 to 5, or 0.1 to 3. The lower the transparency of the coating layer, the better, and when the transparency satisfies the above range, the transparency of the film is excellent.

When necessary, in the optical film according to the present invention, surface treatment may be carried out on at least one surface of the transparent film before the coating layer is formed in order for improving adhesive strength or attaching strength, and herein, the surface treatment method may include at least one selected from the group consisting of alkali treatment, corona treatment and plasma treatment. Particularly, when the optical film used in the present invention is an acryl-based film that does not include a lactone ring, carrying out the surface treatment is preferable.

Meanwhile, the optical film according to the present invention may selectively further include a surface coating layer on at least on surface of the transparent film formed with the coating layer. The surface coating layer means a functional layer such as an anti-glare layer, an anti-reflection layer or a hard coating layer.

Herein, the composition for surface coating, which forms the surface coating layer, may be formed to have various compositions depending on the functions to provide, and for example, may contain a binder resin, fine particles and a solvent, and may further includes additives as necessary.

For example, in the present invention, the composition for forming the surface coating layer may use a urethane acryl-based resin and the like as the binder resin, and organic fine particles and inorganic fine particles and the like may be used as the fine particles. Particularly, in the present invention, the composition for surface coating is preferably ultraviolet-curable.

Meanwhile, the formation of the surface coating layer may be carried out including the step of coating, and the steps of drying and curing. Herein, the steps of drying and curing may be separately processed or processed in one step. Herein, the curing step is preferably carried out using ultraviolet light.

Meanwhile, the optical film of the present invention may be further provided with a separate layer having other purposes in addition the surface coating layer. For example, an anti-contamination layer for preventing the contamination of a display surface, and the like, may be further provided, and other layers having various purposes may be further provided without limit.

Figure 2:
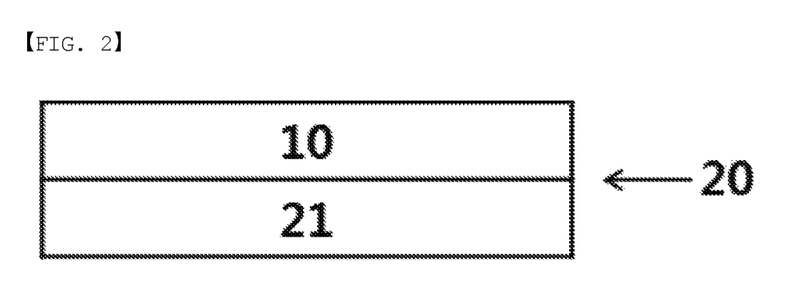
FIG. 2 depicts a polarizing plate according to an exemplary embodiment of the present specification.

Next, a polarizing plate (20) of the present invention includes a polarizer (21), and the optical film (10) according to the present invention on at least one surface of the polarizer as shown in FIG. 2.

Herein, the polarizer is not particularly limited, and polarizers well known in the art, for example, films formed with polyvinyl alcohol (PVA) including iodine or dichroic dye may be used. In the present invention, a polarizer means a state not including a protective film (transparent film), and a polarizing plate means a state including a protective film (transparent film).

Meanwhile, the polarizing plate according to the present invention may further include an adhesive layer on one or both surfaces of the polarizer. For example, the polarizing plate of the present invention may be formed to have a one side surface structure of [transparent film/coating layer/adhesive layer/polarizer] with the polarizer of the present invention as a base, however, the structure is not limited thereto. Herein, the adhesive capable of being used in forming the adhesive layer may include aqueous or non-aqueous adhesives generally used in the art.

In the present invention, for example, polyvinyl alcohol-based adhesives, acryl-based adhesives, epoxy-based adhesives, urethane-based adhesives and the like may be used as the aqueous adhesive without limit. Considering the adhesive strength with a polarizer and the like, and the like, polyvinyl alcohol-based adhesives are preferable among these, and modified polyvinyl alcohol adhesives including an acetoacetyl group may further improve an adhesive property. Specific examples of the polyvinyl alcohol-based adhesive may include Gohsefiner Z-100, Z-200, Z-200H, Z-210, Z-220, Z-320 and the like manufactured by the Nippon Synthetic Chemical Industry Co., Ltd., but are not limited thereto.

Herein, adhesion between a polarizer and a protective film layer using the aqueous adhesive may be carried out using a method of coating the adhesive on the surface of a protective film for a polarizer, or a PVA film, which is the polarizer, using a roll coater, a gravure coater, a bar coater, a knife coater, or a capillary coater and the like, and then laminating the protective film and the polarizing film with heat pressing or room temperature pressing using a laminating roll before the adhesive is completely dried. When a hot-melt type adhesive is used, a heat pressing roll needs to be used.

Meanwhile, the non-aqueous adhesive is not particularly limited as long as it is radical-curable, and examples thereof may include an adhesive using a photoradical polymerization reaction such as a (meth)acrylate-based adhesive, an ene/thiol-based adhesive and an unsaturated polyester-based adhesive, an adhesive using a photocation polymerization reaction such as an epoxy-based adhesive, an oxetane-based adhesive, an epoxy/oxetane-based adhesive and a vinylether-based adhesive, and the like.

Herein, adhesion between a polarizer and an optical film using the non-aqueous adhesive may be carried out using a method of forming an adhesive layer by applying the adhesive composition, laminating the polarizer and the optical film, and curing the adhesive composition through light irradiation.

The polarizing plate according to the present invention prepared as above may be used for various applications. Specifically, the polarizing plate according to the present invention may be preferably used for image display devices including polarizing plates for liquid crystal display devices (LCD), polarizing plates for anti-reflection of organic EL display devices, and the like. In addition, the polarizing plate according to the present invention may be used for various functional films, for example, complex polarizing plates combining various optical layers such as a retardation plate including a λ/4 plate, a λ/2 plate and the like, a light diffusion plate, a wide view plate, a brightness enhancement plate and a reflection plate.

Preparation Examples 1 to 7

Water-dispersible coating compositions (A) to (G) were prepared by mixing a polymer resin, a cross-linking agent, silica and water with the constitutions and the content listed in the following [Table 1].

TABLE 1

| | | Polymer Resin | | Cross-linking Agent | | Silica | | |
|---|---|---|---|---|---|---|---|---|
| Category | | Type | Content (g) | Type | Content (g) | Type | Content (g) | Water (g) |
| Preparation Example 1 | A | CK-PUD-1004A (Solid 30%) | 40 | Tyzor LA (Solid 50%) | 1.2 | 100 nm (Solid 20%) | 3.0 | 55.8 |
| Preparation Example 2 | B | CK-PUD-1004A (Solid 30%) | 40 | Tyzor 217 (Solid 100%) | 0.6 | 100 nm (Solid 20%) | 3.0 | 56.4 |
| Preparation Example 3 | C | A645GH | | Tyzor LA (Solid 50%) | 1.2 | 100 nm (Solid 20%) | 3.0 | 55.8 |
| Preparation Example 4 | D | A645GH | 40 | Tyzor 217 (Solid 100%) | 0.6 | 100 nm (Solid 20%) | 3.0 | 56.4 |

TABLE 1-continued

| Category | | Polymer Resin | | Cross-linking Agent | | Silica | | Water |
|---|---|---|---|---|---|---|---|---|
| | | Type | Content (g) | Type | Content (g) | Type | Content (g) | (g) |
| Preparation Example 5 | E | CK-PUD-1004A (Solid 30%) | 40 | — | — | 100 nm (Solid 20%) | 3.0 | 57 |
| Preparation Example 6 | F | A645GH | 40 | — | — | 100 nm (Solid 20%) | 3.0 | 57 |
| Preparation Example 7 | G | CK-PUD-1004A (Solid 30%) | 40 | Oxazoline Crosslinking Agent (Solid 25%) | 2.4 | 100 nm (Solid 20%) | 3.0 | 54.6 |

Meanwhile, in [Table 1], CK-PUD-1004A is a trade name of a polyurethane-based resin sold by Chokwang Paint Ltd., A645GH is a trade name of a polyester acryl-based resin sold by Takamatsu oil & fat Co. Ltd., and Tyzor LA and Tyzor 217 are trade names of a titanate-based cross-linking agent sold by Dorf Ketal Chemicals LLC.

Example 1

After an unoriented film having a width of 800 mm was prepared with a poly(cyclohexylmaleimide-co-methyl methacrylate) (LG MMA PMMA830HR) resin using a T-die film-forming apparatus under a condition of 250° C. and 250 rpm, the film was oriented by 1.8 times in an MD direction at a temperature of 135° C.

Next, the water-dispersible coating composition (A) was coated on both surfaces of the oriented acrylic film using a Maryer bar. Subsequently, the result was oriented by 2.0 times in a TD direction, and an acryl-based film formed with a coating layer on both surfaces was prepared. Herein, the thickness of the coating layer was 600 nm.

Example 2

An acrylic film was prepared in the same manner as in Example 1 except that the water-dispersible coating composition (B) was used.

Example 3

An acrylic film was prepared in the same manner as in Example 1 except that the water-dispersible coating composition (C) was used.

Example 4

An acrylic film was prepared in the same manner as in Example 1 except that the water-dispersible coating composition (D) was used.

Comparative Example 1

An acrylic film was prepared in the same manner as in Example 1 except that the water-dispersible coating composition (E) was used.

Comparative Example 2

An acrylic film was prepared in the same manner as in Example 1 except that the water-dispersible coating composition (F) was used.

Comparative Example 3

An acrylic film was prepared in the same manner as in Example 1 except that the water-dispersible coating composition (G) was used.

Test Example 1. Evaluation on Solvent Resistance of Coating Layer

The surface of the acrylic film formed with the coating layer prepared in Examples 1 to 4 and Comparative Examples 1 to 3 was rubbed three times with ethanol-coated cotton, and the degree of the coating layer remaining was evaluated. The evaluation results are shown in [Table 2], and the case of no coating layer remaining was marked as X, the case of 70% or less of the coating layer remaining was marked as Δ, the case of 71% to 90% of the coating layer remaining was marked as ○, and the case of 91% to 100% of the coating layer remaining was marked as ⊚.

Test Example 2. Evaluation on Transparency of Coating Layer

The transparency of the acrylic film prepared in Examples 1 to 4 and Comparative Examples 1 to 3 was evaluated by measuring haze using an HM-150 (murakami color research laboratory). The measurement results are shown in the following [Table 2].

TABLE 2

| Category | Water-dispersible Coating Composition | Solvent Resistance | Transparency |
|---|---|---|---|
| Example 1 | A | ○ | 0.6 |
| Example 2 | B | ⊚ | 0.6 |
| Example 3 | C | ⊚ | 0.6 |
| Example 4 | D | ⊚ | 0.6 |
| Comparative Example 1 | E | X | 0.5 |
| Comparative Example 2 | F | Δ | 0.5 |
| Comparative Example 3 | G | Δ | 0.6 |

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. An optical film comprising:

a transparent film; and a coating layer on at least one surface of the transparent film, wherein the coating layer is formed using a water-dispersible coating composition which includes a polymer resin including a hydroxyl group in 100 parts by weight at least one cross-linking agent selected from the group consisting of a titanate-based cross-linking agent and a zirconate-based cross-linking agent in 0.01 to 10 parts by weight and water-dispersible fine particles in 0.01 to 20 parts by weight.

2. The optical film of claim 1, wherein the titanate-based cross-linking agent is a compound represented by the following Chemical Formula 1:

[Chemical Formula 1]

wherein, in Chemical Formula 1, $R_1$ to $R_4$ are each independently a $C_{1\text{-}4}$ alkoxy group, a chelate group or a hydroxyl group.

3. The optical film of claim 1, wherein the zirconate-based cross-linking agent is a compound represented by the following Chemical Formula 2:

[Chemical Formula 2]

wherein, in Chemical Formula 2, $R_5$ to $R_8$ are each independently a $C_{1\text{-}4}$ alkoxy group, a chelate group or a hydroxyl group.

4. The optical film of claim 1, wherein the polymer resin is selected from the group consisting of polyurethane, polyester, acryl, polyurethane acrylate, acryl, polyester-based acryl, polyester-based urethane and a mixture thereof.

5. The optical film of claim 1, wherein the polymer resin further includes one or more types of functional groups selected from the group consisting of a carboxyl group and a sulfonate group.

6. The optical film of claim 1, wherein the water-dispersible fine particles are one or more types selected from the group consisting of silica-based, titania-based, alumina-based, zirconia-based and antimony-based fine particles.

7. The optical film of claim 1, wherein a thickness of the coating layer is 50 nm to 1000 nm.

8. The optical film of claim 1, wherein the transparent film is an acryl-based film.

9. The optical film of claim 1 comprising a surface coating layer on at least one surface of the transparent film formed with the coating layer.

10. A polarizing plate comprising:

a polarizer; and the optical film of claim 1 on at least one surface of the polarizer.

* * * * *